(12) United States Patent
Yang et al.

(10) Patent No.: US 11,451,997 B2
(45) Date of Patent: *Sep. 20, 2022

(54) SYSTEMS AND METHODS FOR A SELF-ORGANIZING NETWORK BASED ON USER EQUIPMENT INFORMATION

(71) Applicant: Verizon Patent and Licensing Inc., Basking Ridge, NJ (US)

(72) Inventors: Jin Yang, Orinda, CA (US); Ratul K. Guha, Kendall Park, NJ (US); Edmond K. Chan, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/887,873

(22) Filed: May 29, 2020

(65) Prior Publication Data

US 2020/0296615 A1    Sep. 17, 2020

Related U.S. Application Data

(63) Continuation of application No. 15/860,083, filed on Jan. 2, 2018, now Pat. No. 10,708,806.

(51) Int. Cl.

| | | |
|---|---|---|
| *H04L 12/00* | (2006.01) | |
| *H04W 28/02* | (2009.01) | |
| *H04W 24/02* | (2009.01) | |
| *H04L 43/08* | (2022.01) | |
| *H04L 43/16* | (2022.01) | |

(Continued)

(52) U.S. Cl.
CPC ......... *H04W 28/021* (2013.01); *H04L 43/08* (2013.01); *H04L 43/16* (2013.01); *H04W 24/02* (2013.01); *H04L 41/16* (2013.01); *H04L 67/12* (2013.01); *H04W 16/28* (2013.01); *H04W 28/0215* (2013.01); *H04W 36/30* (2013.01); *H04W 40/34* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2015/0141027 A1 | 5/2015 | Tsui et al. | |
| 2015/0146675 A1* | 5/2015 | Zhang | H04W 72/0406 370/329 |

(Continued)

*Primary Examiner* — Noel R Beharry
*Assistant Examiner* — Lionel Preval

(57) ABSTRACT

A computer device may include a memory configured to store instructions and a processor configured to execute the instructions to determine network slices for a plurality of user equipment (UE) devices associated with a base station wherein a particular network slice identifies a particular service category or a UE device attribute category associated with particular ones of the plurality of UE devices, determine a distribution of network slices for the base station based on the determined network slices for the plurality of UE devices, and determine an adjustment for an optimization parameter based on the distribution of network slices for the base station. The computer device may be further configured to adjust the optimization parameter for the base station based on the determined adjustment, wherein adjusted optimization parameter is used by the base station to manage data traffic associated with the plurality of UE devices.

20 Claims, 12 Drawing Sheets

(51) Int. Cl.
*H04L 41/16* (2022.01)
*H04W 84/18* (2009.01)
*H04W 40/34* (2009.01)
*H04W 16/28* (2009.01)
*H04W 36/30* (2009.01)
*H04L 67/12* (2022.01)

(56) References Cited

U.S. PATENT DOCUMENTS

| | | |
|---|---|---|
| 2016/0157252 A1 | 6/2016 | Lu et al. |
| 2016/0165472 A1 | 6/2016 | Gopalakrishnan et al. |
| 2017/0245176 A1* | 8/2017 | Murphy ................ H04L 41/145 |
| 2018/0176848 A1 | 6/2018 | Tabet et al. |
| 2018/0324671 A1* | 11/2018 | Palnati .................... H04W 8/26 |
| 2019/0141580 A1* | 5/2019 | Oktay .................... H04W 72/08 |
| 2020/0367109 A1* | 11/2020 | Chen ..................... H04W 28/24 |

* cited by examiner

| SERVICE CATEGORIES 910 | 1 | 2 | 3 | 2 | 3 | 4 | 5 | 6 | 7 | ... | TOTAL |
|---|---|---|---|---|---|---|---|---|---|---|---|
| DEVICE TYPES 920 | CAT4 | CAT4 | CAT4 | CAT12 | CAT12 | CAT12 | CAT-M1 | CAT-M1 | NB-IoT | | |
| SERVICE TYPES 930 | VOLTE | HD VIDEO | MBB | HD VIDEO | MBB | URLLC | IoT | URLLC | INDUSTRIAL IoT | | |
| WEIGHTING: HD VIDEO 940 | 0% | 50% | 0% | 50% | 0% | 0% | 0% | 0% | 0% | | 100% |
| POWER DISTRIBUTION 950 | 15% | 10% | 7.5% | 10% | 7.5% | 20% | 5% | 20% | 5% | | 100% |
| WEIGHTING FOR TILTING 960 | 15% | 13% | 12% | 13% | 12% | 15% | 5% | 15% | 0% | | 100% |

| SERVICE CATEGORIES 1010 | 1 | 2 | 3 | 2 | 3 | 4 | 5 | 6 | ... | TOTAL |
|---|---|---|---|---|---|---|---|---|---|---|
| DEVICE TYPES 1020 | CAT4 | CAT4 | CAT4 | CAT12 | CAT12 | CAT12 | CAT-M1 | CAT-M1 | NB-IoT | |
| SERVICE TYPES 1030 | VOLTE | HD VIDEO | MBB | HD VIDEO | MBB | URLLC | IoT | URLLC | INDUSTRIAL IoT | |
| WEIGHTING FOR DROP CALL 1040 | 15% | 10% | 10% | 10% | 10% | 15% | 5% | 20% | 5% | 100% |
| WEIGHTING FOR LATENCY 1050 | 10% | 10% | 10% | 10% | 10% | 25% | 0% | 25% | 0% | 100% |

| PATHLOSS/<br>DEVICE TYPE<br>1110 | IoT | CAT4 | CAT12 |
|---|---|---|---|
| < 80 dB<br>1120 | 10% | 20% | 40% |
| 80 – 100 dB<br>1130 | 20% | 35% | 30% |
| 100 – 120 dB<br>1140 | 30% | 40% | 30% |
| > 120 dB<br>1150 | 40% | 5% | 0% |

FIG. 11

SYSTEMS AND METHODS FOR A SELF-ORGANIZING NETWORK BASED ON USER EQUIPMENT INFORMATION

CROSS REFERENCE TO RELATED APPLICATIONS

This patent application is a continuation of U.S. patent application Ser. No. 15/860,083, filed on Jan. 2, 2018 and titled "SYSTEMS AND METHODS FOR A SELF-ORGANIZING NETWORK BASED ON USER EQUIPMENT INFORMATION," the contents of which are hereby incorporated by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage and service a large number of devices. In order to maintain quality of service across a network, or across multiple networks, the provider may need to take into account various conditions that vary across networks and/or devices.

BRIEF DESCRIPTION OF THE DRAWINGS

FIG. 10 is a diagram of a second exemplary network slices distribution according to an implementation described herein; and FIG. 11 is a diagram of a third exemplary network slices distribution according to an implementation described herein.

DETAILED DESCRIPTION OF PREFERRED EMBODIMENTS

Figure 1:
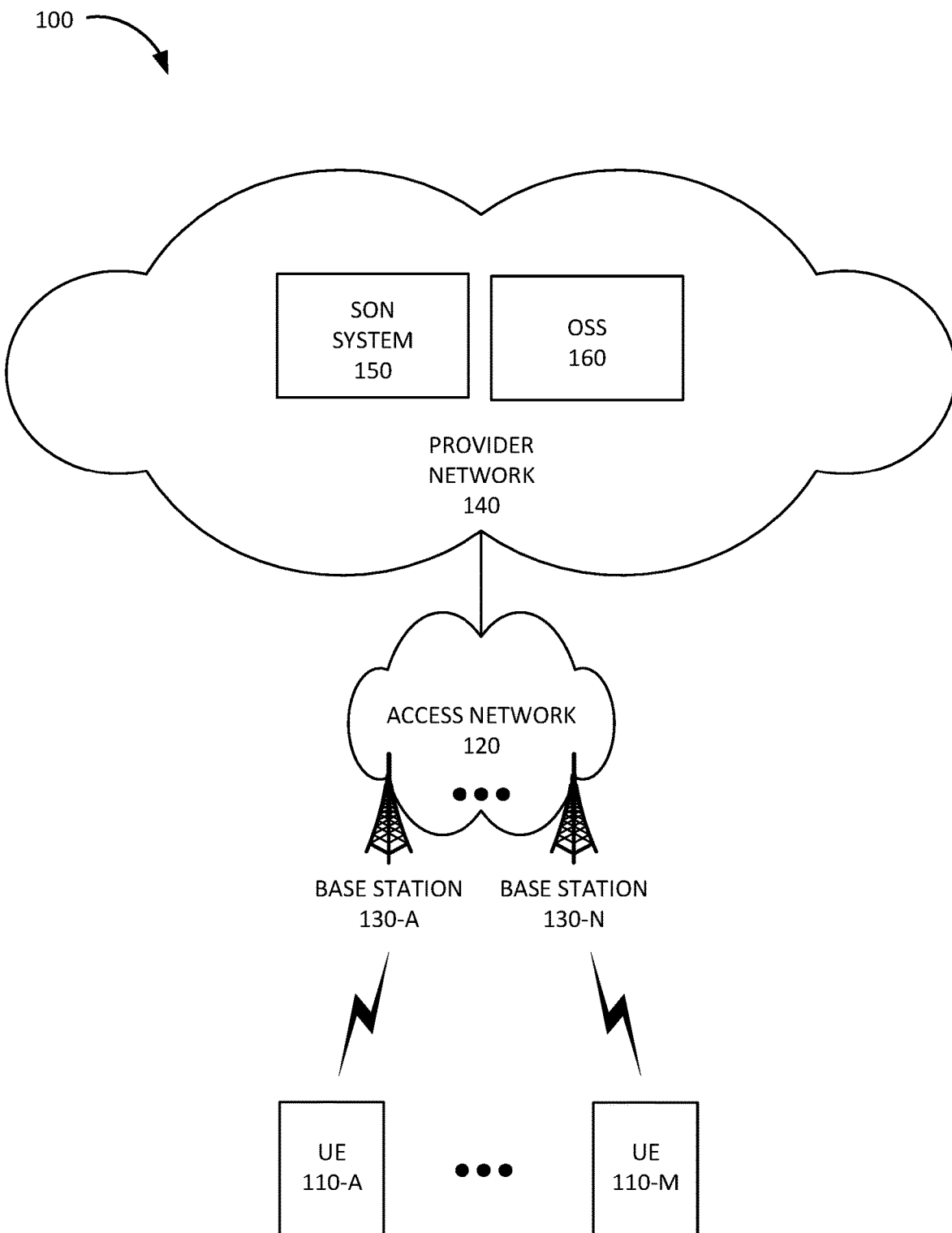
FIG. 1 is a diagram illustrating an environment according to an implementation described herein.

The following detailed description refers to the accompanying drawings. The same reference numbers in different drawings identify the same or similar elements.

A wireless access network may enable wireless communication devices to connect to a base station via wireless signals. A wireless communication device may connect to a provider network via the wireless access network and may use various applications, such as voice communication, video streaming, sending or receiving data via the Internet, etc. Furthermore, wireless communication devices may be mobile and may move out of communication range of a first base station and into the communication range of a second base station. In response, the wireless access network may handover control and service of a wireless communication device from the first base station to the second base station.

In the course of providing services to wireless communication devices, the operating conditions of the wireless access network may change. As an example, the number of wireless devices attached to a base station may increase and reduce the available capacity of the base station. As another example, a base station may experience fading of wireless signals on particular channels due to changes in the environment. As yet another example, a list of neighboring base stations, referred to as a "neighbor list," may change as base stations are added, removed, or changed.

Self-organizing networks (SONs) (sometimes also referred to as "self-optimizing networks") have enabled automation of optimization functions for wireless networks and may be deployed at a scale to manage wireless networks, such as 4G and 5G wireless networks. SON functions may be used to enable discovery and optimization of base station neighbor lists, modification of antenna tilts or directions to improve coverage or capacity, changes to handoff parameters to reduce handover drops, and/or other types of parameters that previously required laborious procedures to be executed manually.

SON functions may be carried out by obtaining various metrics, also referred to as key performance indicators (KPIs), across a large number of base stations and user equipment (UE) devices and to perform autonomous analysis on the obtained metrics. The result of the analysis may indicate a change in one or more parameters of a base station to optimize (i.e., improve) the functioning of the base station in response to changing conditions.

As the data traffic and number of UE devices using wireless access networks increase, the number of different types of UE devices and the number of different types of data also increase. As an example, an exponential growth in Internet of Things (IoT) applications leads to an increasing number of different types of UE devices employing machine-to-machine (M2M) communication, such as Machine-Type Communication (MTC), a type of M2M communication standard developed by the 3$^{rd}$ Generation Partnership Project (3GPP). As another example, wireless communication is increasingly being used for new types of applications, such as connected cars, connected public transport systems, and drones. New types of UE devices and/or new types of use cases for wireless communication may challenge existing SON processes.

For example, SON processes may rely on network performance data collected from a Network Management System (NMS) that manages wireless access network parameters, and may not utilize information relating to particular UE devices, such as a service category associated with a particular UE device. Furthermore, some parameters, such as, for example, antenna tilting parameters, may only be adjustable at a particular base station, and may require information relevant to the particular base station.

Implementations described herein relate to systems and methods for a SON based on UE device information. The UE device information may include service category information, UE device attribute category information, position and route profile information, pathloss information, price sensitivity information, and/or other types of information. The UE device information may be used in addition to network performance information to determine adjustments to optimization parameters. In some implementations, initial values for the parameters may be set and the parameters may be later adjusted by the SON system based on network performance information and based on the UE device information.

Services provided by a network provider to UE devices may be divided into network slices. A computer device, associated with a SON system, may determine network slices for UE devices associated with a base station and determine a distribution of network slices for the base station based on the determined network slices for the UE devices. A "network slice," as the term is used herein, identifies to a particular service category and/or a particular UE device attribute category associated with particular UE devices associated with the base station.

A service category refers to a class of service for data being sent and/or received by a UE device classified in the service category. The service categories may include, for example, a high density (HD) voice service category, an HD video service category, a mobile broadband (MBB) service category, an MBB Ultra-Reliable Low Latency (uRLLC) service category, a voice service category, a video service category, an IoT data category, an IoT uRLLC category, an IoT Data over Non-Access Stratum (DoNAS) service category, and/or another type of service category.

A UE device attribute category refers to a particular attribute associated with UE devices classified in the UE device attribute category. The UE device attribute categories may include, for example, a category associated with a particular value or range of values for a latency requirement associated with a UE device, a reliability requirement associated with the UE device, a connectivity requirement associated with the UE device, a mobility requirement associated with the UE device, a throughput requirement associated with the UE device, and/or another type of requirement associated with a UE device. Furthermore, in some implementations, the UE device categories may include a category associated with a particular private network identifier. Thus, a UE device attribute category may correspond to a category of UE devices associated with a particular private network and/or service provider. In some implementations, UE devices may be classified into network slices using a machine learning classifier.

After determining a distribution of network slices for the base station, the computer device may then determine an adjustment for an optimization parameter based on the distribution of network slices for the base station and automatically and/or autonomously adjust the optimization parameter for the base station based on the determined adjustment. The adjusted optimization parameter may be used by the base station to manage data traffic associated with the UE devices.

Determining the distribution of network slices may include determining a weight for a particular network slice based on a ratio of a number of UE devices associated with the particular network slice to a total number of UE devices associated with the base station and/or based on a criticality score assigned to the particular network slice. Weights may be applied before determining a parameter based on an optimization function that uses one or more KPIs or after the optimization function is applied to a particular network slice. Thus, in some implementations, determining the adjustment for the optimization parameter may include determining a network slice adjustment for the particular network slice based on one or more KPIs and a determined weight for the particular category and the determined network slice adjustment. In other implementations, determining the adjustment for the optimization parameter may include determining a network slice KPI value for the particular network slice, determining a total performance indicator value as a weighted sum based on the network slice KPI value and a weight associated with the particular network slice, and determining the adjustment for the optimization parameter as a function of the total performance indicator value.

Furthermore, in some implementations, the weights may be tuned or adjusted based on a criticality and/or importance for a particular network slice during a particular time period. Thus, the computer device may receive an indication of importance associated with a particular network slice and increase the weight associated with the particular network slice, in response to receiving the indication of importance associated with the particular network slice. Moreover, different KPIs may be assigned different weights when computing an optimization parameter.

In some implementations, the computer device, associated with a SON system, may determine positioning and/or route profiles for the UE devices associated with the base station and determine the adjustment for the optimization parameter further based on the determined positioning and/or route profiles for the UE devices. The positioning and/or route profiles may indicate historical position and routes associated with particular UE devices.

In some implementations, the computer device, associated with a SON system, may obtain pathloss information for the UE devices, generate a set of pathloss value ranges, and determine a distribution of network slices for each of the pathloss value ranges based on the obtained pathloss information and determined network slices for the UE devices. The computer device may then determine the adjustment for the optimization parameter further based on the distribution of network slices for the pathloss value ranges.

The optimization parameter may include a coverage optimization parameter, an antenna tilt parameter, a power distribution parameter, a retransmission parameter, a handover parameter, a neighbor list changes parameter, a load balancing parameter, a delay optimization parameter, a carrier optimization parameter, a random access channel parameter, and/or another type of parameter (associated with a wireless access network) that may be adjusted by a SON system.

The KPIs used to compute adjustments for an optimization parameter may include one or more key performance indicators (KPIs), such as, for example, accessibility KPIs (e.g., a Radio Resource Control (RRC) setup success rate, a RAB success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of KPIs.

Different types of information may be used to classify a particular UE device into a particular service category, such as, for example, information indicating whether a UE device is associated with a user, information indicating whether a UE device is associated with a voice or video bearer, packet size information associated with a UE device, information indicating whether a UE device is associated with a high reliability and/or low latency bearer, and/or other types of information.

As an example, determining the service categories for the UE devices associated with a base station may include determining that a particular UE device is associated with a packet size less than a first packet size threshold (e.g., ten Megabytes, etc.) and classifying the particular UE device into an IoT data service category, in response to determining that the particular UE device is associated with a packet size less than the first packet size threshold. As another example, determining the service categories for the UE devices associated with a base station may include determining that a particular UE device is associated with a packet size less than a second packet size threshold (e.g., one kilobyte, etc.) and classifying the UE device into a DoNAS service category, in response to determining that the particular UE device is associated with a packet size less than the second packet size threshold. As yet another example, determining the service categories for the UE devices associated with a base station may include determining that a particular UE device is associated with a high reliability and low latency requirement and classifying the particular UE device into a uRLLC service category, in response to determining that the particular UE device is associated with a high reliability and low latency requirement.

In some implementations, one or more UE devices may be re-assigned to a different network slice. For example, the computer device, associated with the SON system, may determine that a measure of congestion associated with a particular network slice is higher than a congestion threshold and assign at least some of the UE devices associated with the particular network slice to a different network slice. Furthermore, in some implementations, the SON system may determine a performance score for a wireless access network associated with the base station based on the adjusted optimization parameter revert the optimization parameter to a previous value, when the determined performance score does not result in an improvement over a previous performance score.

FIG. 1 is a diagram of an exemplary environment 100 in which systems and/or methods, described herein, may be implemented. As shown in FIG. 1, environment 100 may include UE devices 110-A to 110-M, an access network 120, and provider network 140. Access network 120 may include base stations 130-A to 130-N and a particular UE device 110 may connect to access network 120 via a particular base station 130 using wireless signals. While a single access network 120 is shown in FIG. 1 for illustrative purposes, in practice, environment 100 may include multiple access networks 120.

In some implementations, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; a home appliance device; a home monitoring device; and/or any other type of computer device with wireless communication capabilities.

In other implementations, UE device 110 may include an IoT device enabled with wireless communication functionality and employing machine-to-machine (M2M) communication, such as, for example, Machine-Type Communication (MTC), a type of M2M communication standard developed by the 3$^{rd}$ Generation Partnership Project (3GPP). Examples of such M2M devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), an unmanned aerial drone vehicle or aircraft system, and/or another type of electronic device.

Access network 120 may provide access to services available via provider network 140 for UE devices 110, including mobile telephone service, video content delivery, Internet access, and/or other types of data services. For example, access network 120 may establish a packet data network connection (e.g., an Internet Protocol (IP) connection) between UE device 110 and provider network 140. In some implementations, access network 120 may include a Long Term Evolution (LTE) access network (e.g., an evolved packet core (EPC) network). In other implementations, access network 120 may include an LTE Advanced (LTE-A) access network and/or a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CoMP); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. In yet other implementations, access network 120 may include a Code Division Multiple Access (CDMA) access network based on, for example, a CDMA1000 standard. For example, the CDMA access network may include a CDMA enhanced High Rate Packet Data (eHRPD) network (which may provide access to an LTE access network).

As stated above, access network 120 may include a base station 130 and UE device 110 may wirelessly communicate with access network 120 via base station 130. In other words, UE device 110 may be located within the geographic area serviced by base station 130. Base station 130 may be part of an LTE eNodeB base station device and/or another LTE-A or 5G base station device (e.g., a gNodeB). An eNodeB base station device may use the Evolved Universal Terrestrial Radio Access (E-UTRA) air interface or other air interfaces to wirelessly communicate with devices. An eNodeB base station device may include one or more devices (e.g., base stations 130) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

Provider network 140 may be managed, at least in part, by a provider of communication services associated with access network 120. Provider network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Provider network 140 may allow the delivery of Internet Protocol (IP) services to UE device 110, and may interface with other external networks. In some implementations, provider network 140 may include an Internet Protocol Multimedia Subsystem (IMS) network (not shown in FIG. 1). An IMS network may include a network for delivering IP multimedia services as specified by 3GPP or other standards/protocols and may provide media flows between UE device 110 and external IP networks or external circuit-switched networks (not shown in FIG. 1). Provider network 140 may include one or more server devices and/or network devices, or other types of computation or communication devices to manage the functionality of provider network 140. For example, provider network 140 may include a SON system 150 and an Operations Support System (OSS) 160.

SON system 150 may include one or more devices, such as computer devices and/or server devices, which perform self-organization functions for provider network 140. In particular, SON system 150 may optimize one or more parameters for base station 130 based on information associated with UE devices 110 attached to base station 130. SON system 150 may categorize UE devices 110 based on network slices and may determine a distribution of network slices for base station 130. SON system 150 may further determine positioning and route profiles for UE devices 110, pathloss information for UE device 110, and/or other types of information associated with UE devices 110 and/or the performance of base station 130 servicing UE devices 110 and/or the performance of neighboring base stations 130. SON system 150 may adjust an optimization parameter for base station 130 based on the obtained information. SON system 150 may communicate with OSS 160 to obtain information relating to UE devices 110 and/or base stations 130 and may instruct OSS 160 to adjust a particular parameter for a particular base station 130 based on the obtained information.

OSS 160 may include one or more devices, such as computer devices and/or server devices, which perform operations support functions for provider network 140. Operations support functions may include provisioning of services, service delivery and fulfillment, network configuration and management, fault management, and/or other type of functionalities. OSS 160 may collect metric values, such as particular KPIs, associated with UE devices 110 and/or base stations 130. For example, OSS 160 may receive, at particular intervals, metric values associated with UE devices 110 attached to base station 130. OSS 160 may provide the obtained information to SON system 150. Furthermore, OSS 160 may receive an instruction from SON system 150 to adjust a particular parameter for base station 130 and may instruct base station 130 to adjust the particular parameter in response to the received instruction. Thus, OSS 160 may include a base station manager and a base station database (DB) that stores information identifying particular base stations 130, information indicating how to reach the particular base stations 130, and/or information relating to previous and/or current optimization settings associated with the particular base stations 130.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100. For example, in some implementations, some or all of the functionality of OSS 160 may be implemented in SON system 150. Additionally or alternatively, some or all of the functionality of SON system 150 may be implemented by base station 130 or by a group of base stations 130.

Figure 2:
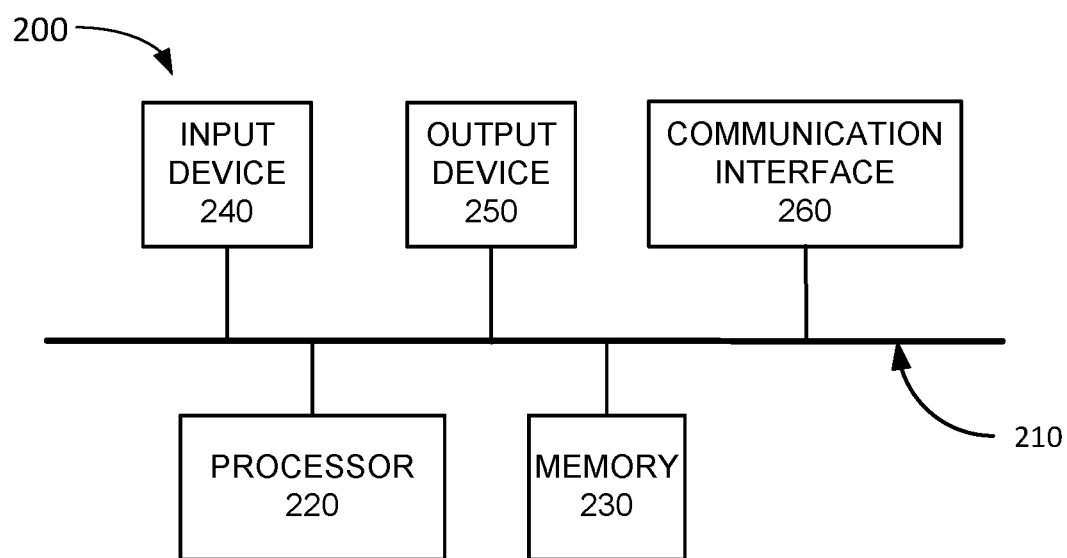
FIG. 2 is a diagram illustrating exemplary components of a device that may be included in a device or system of FIG. 1.

FIG. 2 is a diagram illustrating exemplary components of device 200 according to an implementation described herein. SON system 150, OSS 160, base station 130, and/or UE device 110 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 200 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in UE device 110 and/or base station 130, communication interface 260 may include an antenna assembly that includes one or more antennas to transmit and/or receive RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to determining SON adjustments based on network slices, position and route profiles, pathloss information, and/or other types of information associated with UE devices 110. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
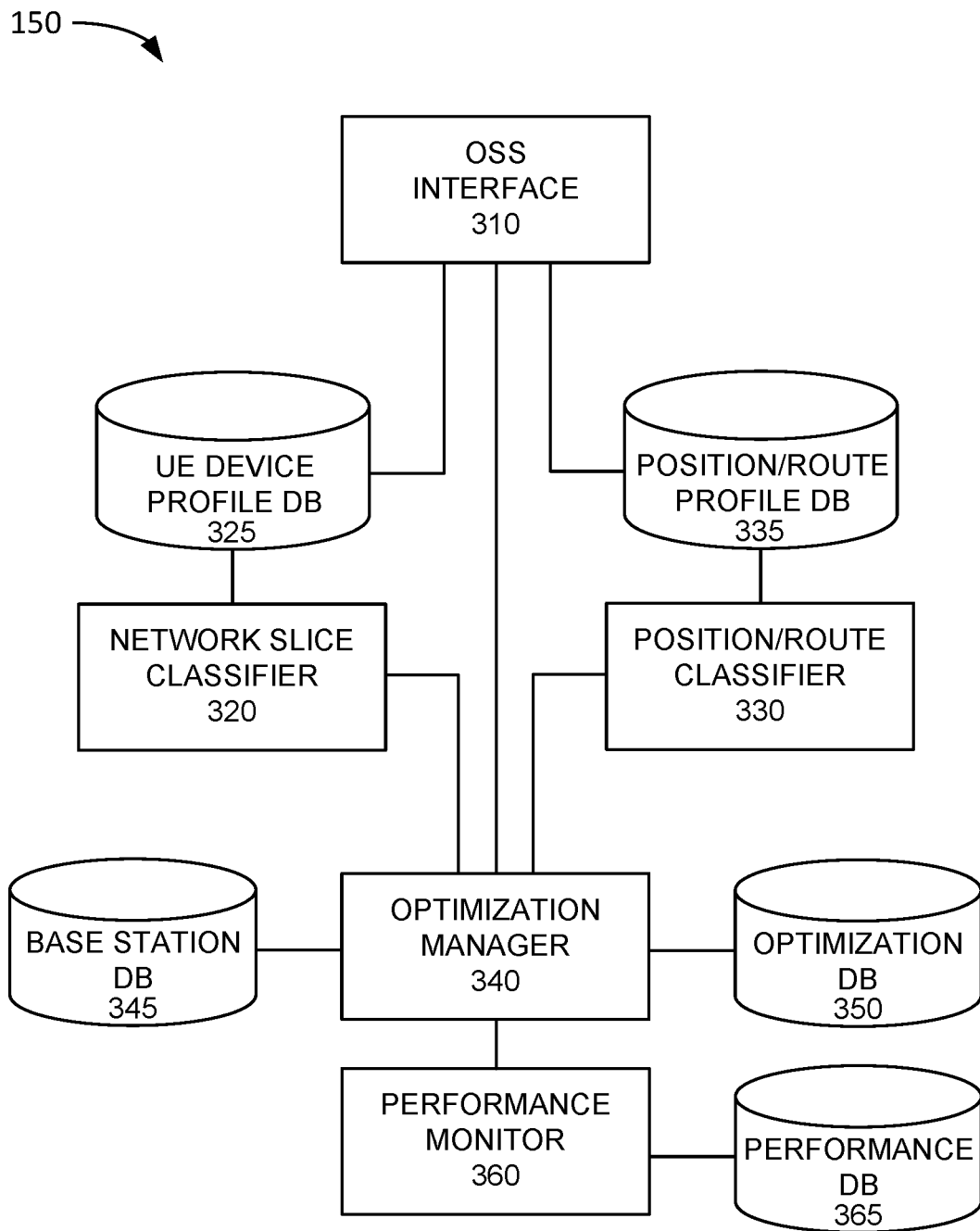
FIG. 3 is a diagram illustrating exemplary functional components of the self-organizing network system of FIG. 1.

FIG. 3 is a diagram illustrating exemplary functional components of SON system 150. The functional components of SON system 150 may be implemented, for example, via processor 220 executing instructions from memory 230. Alternatively, some or all of the functional components included in SON system 150 may be implemented via hard-wired circuitry. As shown in FIG. 3, SON system 150 may include an OSS interface 310, a network slice classifier 320, a UE device profile DB 325, a position/route classifier 330, a position/route profile DB 335, an optimization manager 340, a base station DB 345, an optimization DB 350, a performance monitor 360, and a performance DB 365.

OSS interface 310 may be configured to communicate with OSS 160. For example, OSS 160 may obtain information relating to UE devices 110 from base stations 130, from other devices in access network 120 (e.g., from a Home Subscriber Server), from a DB maintained by OSS 160, and/or from other sources and may provide the obtained information to OSS interface 310. Furthermore, OSS interface 310 may send instructions from optimization manager 340 to OSS 160, such as instructions to adjust a particular optimization parameter for a particular base station 130. Moreover, OSS interface 310 may report information from OSS 160 relating to the performance of access network 120 and/or provider network 140 to other components in SON system 150.

Network slice classifier 320 may classify UE devices 110 into network slices based on information stored in UE device profile DB 325. Exemplary information that may be stored in UE device profile DB 325 is described below with reference to FIG. 4A.

In some implementations, network slice classifier 320 may classify UE devices 110 into network slices based on service categories using one or more criteria based on information that includes data type information, based on bearers associated with a particular UE device 110, based on whether a user is associated with the particular UE device 110, based on packet size associated with the particular UE device 110, based on information that identifies whether the particular UE device 110 is associated with high reliability data, based on an identifier assigned to the particular UE device 110, and/or based on other types of information. Additionally, network slice classifier 320 may classify UE devices 110 into network slices based on particular UE device attribute categories, such as, for example, categories based on a latency requirement, a reliability requirement, a connectivity requirement, a mobility requirement, a throughput requirement, and/or another type of requirement. Moreover, network slice classifier 320 may classify UE devices 110 into network slices based on one or more identifiers, such as, for example, private network identifiers and/or service provider identifiers.

In other implementations, network slice classifier 320 may classify UE devices 110 into network slices using one or more machine learning (ML) classifiers, such as a neural network classifier, a naive Bayesian classifier, a kernel density estimation classifier, a decision tree classifier, a support vector machine classifier, a maximum entropy classifier, and/or another type of classifier. Additionally, network slice classifier 320 may classify UE devices 110 into pathloss range value categories based on pathloss values associated with particular UE devices 110.

Position/route classifier 330 may classify UE devices 110 into position/route categories based on information stored in position/route profile DB 335. Exemplary information that may be stored in position/route profile DB 335 is described below with reference to FIG. 4B. Position/route classifier 330 may classify UE devices 110 into particular location and/or route classes based on the historical locations and routes associated with particular UE devices 110. For example, if a particular UE device 110 is stationary, the particular UE device 110 may be classified into a location category associated with a particular area. In some implementations, location classes may be based on locations of base stations 130. For example, one or more base stations 130 may be associated with a geographic area in which the one or more base stations 130 are located. In other implementations, locations classes may be based on other types of information, such as a geographic grid, postal codes and/or other types of geographic information.

As another example, if the particular UE device 110 is not stationary, but is associated with more than one location, the particular UE device 110 may be classified in multiple location classes and/or may be classified in a particular route class. For example, if the particular UE device 110 corresponds to a user's mobile phone and the user travels between a work location and a home location, the particular UE device 110 may be classified in a route class that includes the route between the work location and home location. Furthermore, a particular UE device 110 may be classified in a first route class during a first time period (e.g., workdays) and in a second route class during a second time period (e.g., weekends).

Optimization manager 340 may use information received from network slice classifier 320 to determine a distribution of network slices for base station 130, a distribution of position/route categories, and/or a distribution of pathloss range values for base station 130 and store the determined distributions in base station DB 345. Exemplary information that may be stored in base station DB 345 is described below with reference to FIG. 4C.

Optimization manager 340 may select a particular base station 130 and a particular parameter to be optimized for the particular base station 130. Optimization manager 340 may then determine an optimization function for the selected parameter that is based on one or more KPIs and determine the KPI values for the KPIs associated with the optimization function using information stored in optimization DB 350. Exemplary information that may be stored in optimization DB 350 is described below with reference to FIG. 4D.

Optimization manager 340 may then determine the distribution of network slices for the particular base station 130, the distribution of position and routing profiles for the particular base station 130, and/or the distribution of pathloss range values for the particular base station 130, and may calculate an adjustment for the selected particular parameter for the selected particular base station 130 based on the determined information.

Performance monitor 360 may monitor the performance of access network 120 and/or provider network 140 based on information stored in performance DB 365. Exemplary information that may be stored in performance DB 365 is described below with reference to FIG. 4E. Performance monitor 360 may obtain one or more KPIs for access network 120 and/or provider network 140 from OSS 160 via OSS interface 310 after optimization manager 340 has selected to adjust a parameter for a particular base station 130 and after the adjustment has been applied to the particular base station 130. If one or more KPI values indicate that performance of access network 120 and/or provider network 140 did not improve after the adjustment, performance monitor 360 may instruct optimization manager 340 to revert to a previous network state before the parameter was adjusted. Thus, performance monitor 360 may implement a reversion mechanism for reversing an optimization adjustment if network performance does not improve as a result of the adjustment.

Although FIG. 3 shows exemplary components of SON system 150, in other implementations, SON system 150 may include fewer components, different components, additional components, or differently arranged components than depicted in FIG. 3. Additionally or alternatively, one or more components of SON system 150 may perform one or more tasks described as being performed by one or more other components of SON system 150. Furthermore, in some implementations, some or all of the functional components of SON system 150 shown in FIG. 3 may be implemented in one or more devices of system 100, such as, for example, base station 130.

Figure 4A:
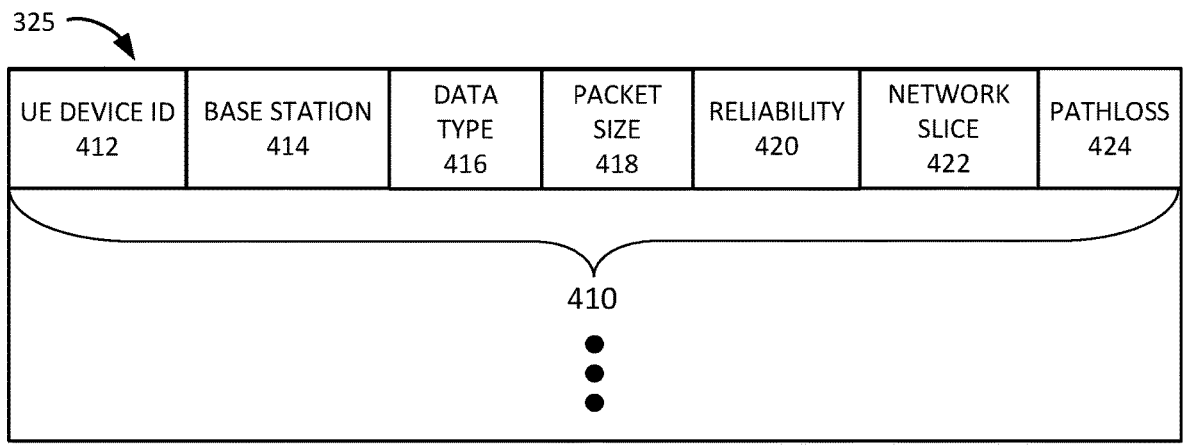
FIG. 4A is a diagram illustrating exemplary components of the user equipment (UE) device profile database (DB) of FIG. 3.

FIG. 4A is a diagram illustrating exemplary components of UE device profile DB 325. As shown in FIG. 4A, UE device profile DB 325 may include one or more UE device records 410. Each UE device record 410 may store information relating to a particular UE device 110. UE device record 410 may include UE device identifier (ID) field 412, a base station field 414, a data type field 416, a packet size field 418, a reliability field 420, a network slice field 422, and a pathloss field 424.

UE device ID field 412 may include an ID that uniquely identifies the particular UE device 110, such as, for example, a Mobile Station International Subscriber Directory Number (MSISDN), an International Mobile Subscriber Identity (IMSI) number, a Mobile Directory Number (MDN), an International Mobile Equipment Identifier (IMEI), a Media Access Control (MAC) address, a Session Initiation Protocol (SIP) address, and/or another type of UE device ID. Base station field 414 may identify a particular base station 130 associated with the particular UE device 110, such as, for example, an IP address associated with the particular base station 130, a base station ID used by access network 120, and/or another type of base station ID.

Data type field 416 may store information identifying a type of data associated with the particular UE device 110. For example, data type field 416 may include information identifying types of bearers associated with the particular UE device 110 (e.g., a number of voice bearers, a number of video bearers, a number of high priority data bearers, etc.), identifying Quality of Service (QoS) classes associated with the particular UE device 110, and/or may include other types of information identifying the type of data associated with the particular UE device 110. Additionally, data type field 416 may store information identifying one or more requirements associated with the particular UE device 110, such as, for example, a latency requirement, a reliability requirement, a connectivity requirement, a mobility requirement, a throughput requirement, and/or another type of requirement. Moreover, data type field 416 may store one or more identifiers associated with the particular UE device 110, such as, for example, a private network identifier and/or a service provider identifier.

Packet size field 418 may store information identifying one or more packet sizes associated with the particular UE device 110, such as an average packet size, a maximum packet size, etc. Reliability field 420 may store information identifying one or more measures of data reliability associated with the particular UE device 110. For example, reliability field 420 may identify whether the particular UE device 110 is associated with a data connection that has a high reliability and low latency requirement. Network slice field 422 may include information identifying a network slice into which the particular UE device has been classified. Pathloss field 424 may store information identifying one or more pathloss values associated with the particular UE device 110. For example, pathloss field 424 may include a series of timestamps and corresponding pathloss values for the particular UE device 110.

Although FIG. 4A shows exemplary components of UE device profile DB 325, in other implementations, UE device profile DB 325 may include fewer components, different components, additional components, or differently arranged components than depicted in FIG. 4A.

Figure 4B:
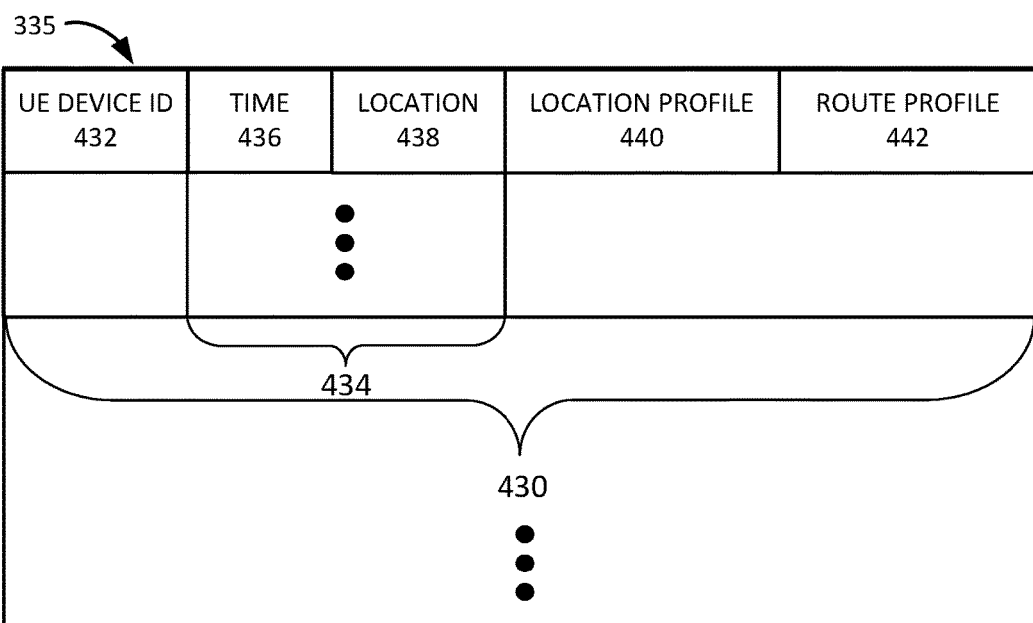
FIG. 4B is a diagram illustrating exemplary components of the position/route profile DB of FIG. 3.

FIG. 4B is a diagram illustrating exemplary components of position/route profile DB 335. As shown in FIG. 4B, position/route profile DB 335 may include one or more UE device records 430. Each UE device record 430 may store information relating to a particular UE device 110. UE device record 430 may include a UE device ID field 432, one or more location records 434, a location profile field 440, and a route profile field 442.

UE device ID field 432 may include an ID that uniquely identifies the particular UE device 110 as explained above with reference to UE device ID field 412.

Each location record 434 may include a time field 436 and a location field 438. Time field 436 may identify a particular time and location field 438 may identify a location associated with the particular time. Thus, location records 434 may store information relating to the location history for the particular UE device 110 and may be used to determine the location and route profile for the particular UE device 110.

Location profile field 440 may store a location profile for the particular UE device 110. For example, the location profile may identify one or more locations at which the particular UE device 110 is located at least a particular percentage of time. Thus, for example, the location profile may identify a home location, a work location, an evening location, a weekend location, etc. Route profile field 442 may identify one or more routes that are traversed by the particular UE device 110 at least a particular percentage of time. For example, the routes may include a home to work route, a work to home route, an evening activity route, a shopping route, etc. The location and route profiles may be used to optimize base stations 130 associated with the locations and routes associated with the particular UE device 110.

Although FIG. 4B shows exemplary components of position/route profile DB 335, in other implementations, position/route profile DB 335 may include fewer components, different components, additional components, or differently arranged components than depicted in FIG. 4B.

Figure 4C:
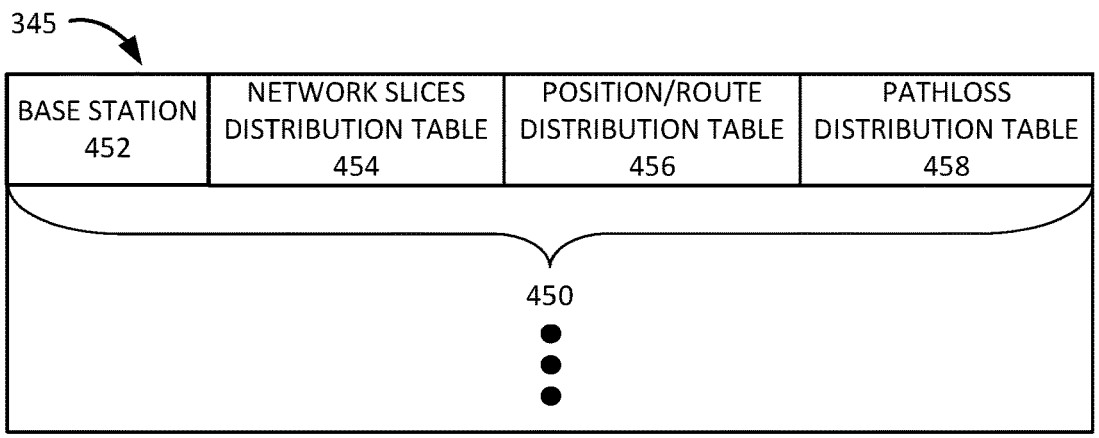
FIG. 4C is a diagram illustrating exemplary components of the performance DB of FIG. 3.

FIG. 4C is a diagram illustrating exemplary components of base station DB 345. As shown in FIG. 4C, base station DB 345 may include one or more base station records 450. Each base station record 450 may store information relating to a particular base station 130. Base station record 450 may include a base station field 452, a network slices distribution table 454, a position/route distribution table 456, and a pathloss distribution table 458.

Base station field 452 may identify a particular base station 130 with an ID such as, for example, an IP address associated with the particular base station 130, a base station ID used by access network 120, and/or another type of base station ID.

Network slices distribution table 454 may include information identifying a distribution of network slices for the particular base station 130. For example, network slices distribution table 454 may store, for each particular network slice, the percentage of UE devices 110, associated with the particular base station 130, that are associated with the particular network slice.

Position/route distribution table 456 may include information identifying a distribution of positions and/or routes for the particular base station 130. For example, position/route distribution table 456 may store, for each particular position and/or route category, the percentage of UE devices 110, associated with the particular base station 130, that are associated with the particular position and/or route category.

Pathloss distribution table 458 may include information identifying a distribution of pathloss range values for the particular base station 130. For example, pathloss distribution table 458 may store, for each particular pathloss distribution value range, the distribution of network slices for the particular base station 130.

Although FIG. 4C shows exemplary components of base station DB 345, in other implementations, base station DB 345 may include fewer components, different components, additional components, or differently arranged components than depicted in FIG. 4C.

Figure 4D:
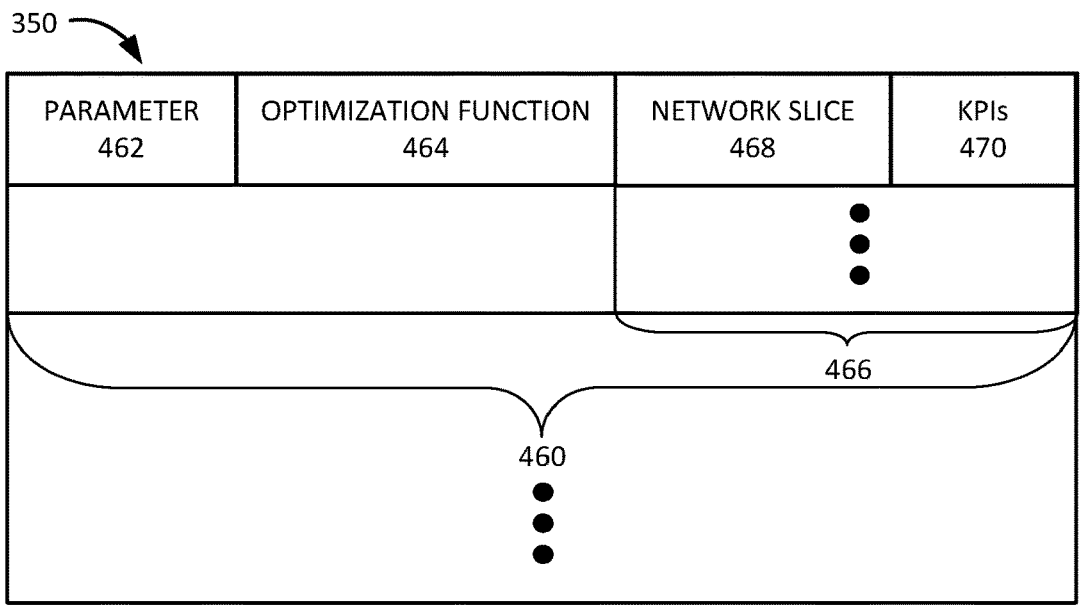
FIG. 4D is a diagram illustrating exemplary components of the optimization DB of FIG. 3.

FIG. 4D is a diagram illustrating exemplary components of optimization DB 350. As shown in FIG. 4D, optimization DB 350 may include one or more optimization records 460. Each optimization record 460 may store information relating to a particular optimization parameter. Optimization record 460 may include a parameter field 462, an optimization function field 464, and one or more network slice records 466.

Parameter field 462 may identify a particular optimization parameter. For example, parameter field 462 may identify an antenna tilt parameter, a power distribution parameter, a retransmission parameter, a handover parameter, a neighbor list changes parameter, a coverage optimization parameter, a load balancing parameter, a delay optimization parameter, a carrier optimization parameter, a random access channel parameter, and/or another type of parameter associated with a wireless access network that may be adjusted by a SON system.

Optimization function field 464 may identify an optimization function associated with the particular optimization parameter. For example, optimization function field 464 may identify a function that uses as input one or more KPI values to determine a value for the particular optimization parameter.

Each network slice record 466 may store KPI values associated with a particular network slice and may include a network slice field 468 and a KPIs field 470. Network slice field 468 may identify the particular network slice and KPIs field 470 may store one or more KPI values associated with the particular network slice, which may be used by the optimization function stored in optimization function field 464.

Although FIG. 4D shows exemplary components of optimization DB 350, in other implementations, optimization DB 350 may include fewer components, different components, additional components, or differently arranged components than depicted in FIG. 4D.

Figure 4E:
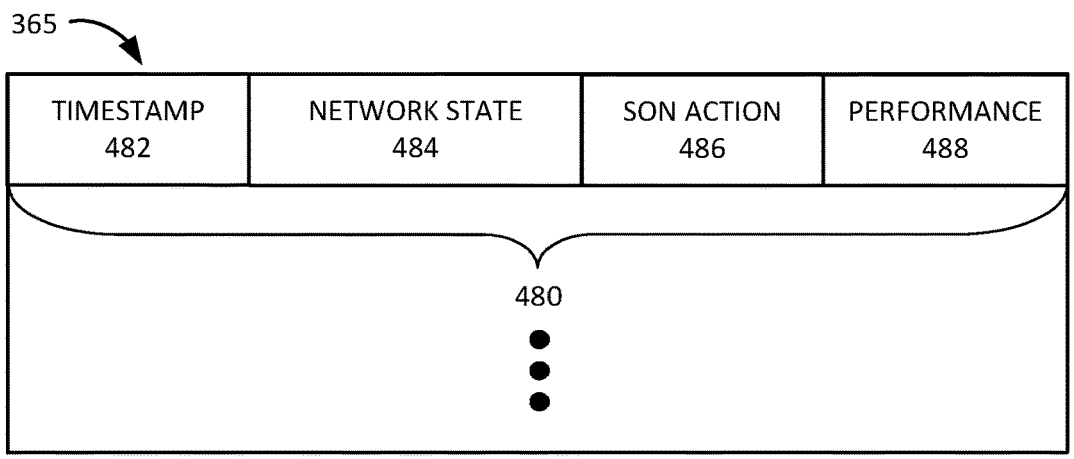
FIG. 4E is a diagram illustrating exemplary components of the base station DB of FIG. 3.

FIG. 4E is a diagram illustrating exemplary components of performance DB 365. As shown in FIG. 4E, performance DB 365 may include one or more performance records 480. Each performance record 480 may store information relating to the performance of access network 120 and/or provider network 140 during a particular time period. Optimization record 480 may include a timestamp field 482, a network state field 484, a SON action field 486, and a performance field 488.

Timestamp field 482 may store a particular timestamp (e.g., a time and date). Network state field 484 may store information identifying a network state associated with access network 120 and/or provider network 140 during the time period associated with the particular timestamp. For example, network state field 484 may identify a particular configuration for the parameters associated with base stations 130 and/or other devices in access network 120 and/or provider network 140.

SON action field 486 may identify a SON action that was performed during the time period associated with the particular timestamp. For example, SON action field 486 may identify an antenna tilt setting, a transmission power setting, a handover parameter (e.g., event A3 parameters, such as a handover offset parameter, a hysteresis parameter, a time to trigger parameter, a cell individual offset parameter, etc.) setting, a retransmission parameter (e.g., a Hybrid Automatic Repeat Request (HARD) number, etc.) setting, a neighbor list changes parameter (e.g., number of neighbors, distance to furthest neighbor, received power associated with furthest neighbor, etc.), a delay optimization setting (e.g., a discontinuous reception (DRX) mode inactivity timer, DRX cycle timer, DRX retransmission timer, etc.), a random access channel parameter (e.g., initial transmission power for a physical random access channel (PRACH), change in transmit power on subsequent attempts for the PRACH, number of attempts allowed on the PRACH, etc.), an RF parameter (e.g., transmit power, antenna azimuth, antenna beam width, downlink or uplink band selection, etc.), a load balancing parameter (e.g., parameters controlling load balancing of traffic of particular QoS classes across multiple cells and/or across multiple base stations 130), a carrier optimization parameter (e.g., a number of secondary carriers in carrier aggregation, etc.), and/or any other type of parameter associated with access network 120 that may be adjusted by SON system 150.

Performance field 488 may identify one or more KPI values associated with the network state during the time period associated with the particular timestamp. For example, performance field 488 may identify an accessibility KPI (e.g., a Radio Resource Control (RRC) setup success rate, a RAB success rate, etc.), retainability KPI (e.g., a call drop rate, etc.), mobility KPI (e.g., a handover success rate, etc.), service integrity KPI (e.g., downlink average throughput, downlink maximum throughput, uplink average throughput, uplink maximum throughput, etc.), utilization KPI (e.g., resource block utilization rate, average processor load, etc.), availability KPI (e.g., radio network unavailability rate, etc.), traffic KPI (e.g., downlink traffic volume, uplink traffic volume, average number of users, maximum number of users, a number of voice bearers, a number of video bearers, etc.), response time KPI (e.g., latency, packet arrival time, etc.), and/or other types of KPIs. The KPIs stored in performance field 488 may be used to determine whether the network performance during the time period associated with the particular timestamp has improved with respect to a previous network state before a SON adjustment to a parameter was applied to base station 130 and/or another device in access network 120.

Although FIG. 4E shows exemplary components of performance DB 365, in other implementations, performance DB 365 may include fewer components, different components, additional components, or differently arranged components than depicted in FIG. 4E.

Figure 5:
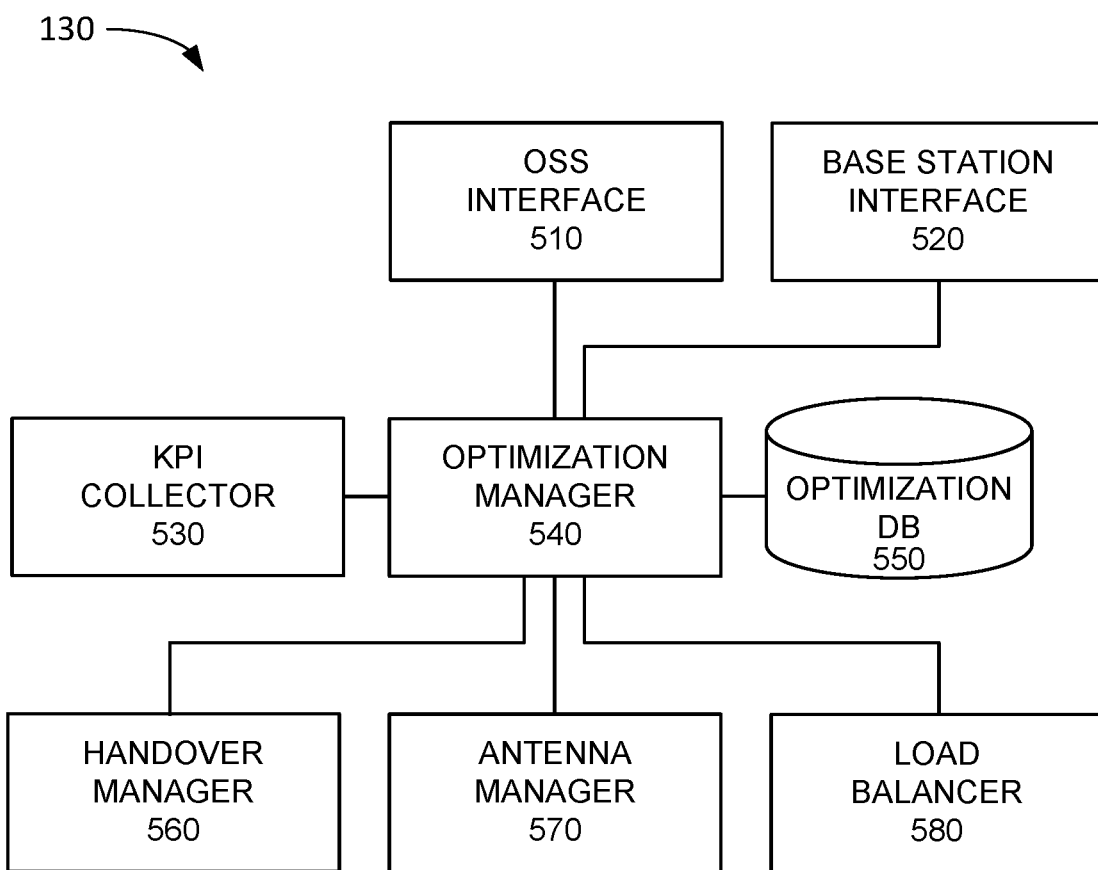
FIG. 5 is a diagram illustrating exemplary functional components of a base station of FIG. 1.

FIG. 5 is a diagram illustrating exemplary functional components of base station 130. The functional components of base station 130 may be implemented, for example, via processor 220 executing instructions from memory 230. Alternatively, some or all of the functional components included in base station 130 may be implemented via hard-wired circuitry. As shown in FIG. 5, base station 130 may include an OSS interface 510, a base station interface 520, a KPI collector 530, an optimization manager 540, an optimization DB 550, a handover manager 560, an antenna manager 570, and a load balancer 580.

OSS interface 510 may be configured to communicate with OSS 160. For example, OSS interface 510 may provide information relating to UE devices 110 associated with base station 130 to OSS 160 and OSS 160 may relay the information to SON system 150. Furthermore, OSS interface 510 may receive an instruction to adjust a particular optimization parameter from SON system 150 via OSS 160 and may provide the received instruction to optimization manager 550.

Furthermore, in some implementations, some SON adjustments may be selected by base station 130 (e.g., local parameters such as handover parameters, antenna tilt or direction adjustments, neighbor lists, etc.), other SON adjustments may be selected by SON system 150 (e.g., global parameters, such as coverage optimization, capacity optimization, etc.), and SON system interface 520 may communicate with SON system 150 via OSS 160 to determine which parameter adjustments should be determined locally by optimization manager 540 and which parameters adjustments should be determined by SON system 150.

Base station interface 520 may be configured to communicate with other base stations 130. For example, some SON parameter adjustments may be based on KPIs associated with a set of base stations 130 in a particular area, where base stations 130 in the area may communicate to determine such SON parameter adjustments using distributed computing. For example, base stations 130 may share neighbor lists, coordinate antenna tilts to reduce interference, and/or load balance traffic by handing over particular types of UE devices 110 to a particular base station 130 with a higher capacity.

KPI collector 530 may collect metric values associated with UE devices 110 attached to base station 130. For example, KPI collector 530 may collect, for a UE device 110 and for a particular time interval, information relating to location of UE device 110, a number of voice bearers associated with UE device 110, a number of video bearers associated with UE device 110, a number of users associated with UE device 110, a data throughput for UE device 110, a number of handovers for UE device 110, a packet size for UE device 110, a variance in packet arrival times for UE device 110, a connection success rate for UE device 110, a call drop rate for UE device 110, a latency for UE device 110, a number of unique cells reported in a time period for UE device 110, a number of cells changed in a time period for UE device 110, an error rate for UE device 110, and/or other KPI values.

Optimization manager 540 may adjust SON optimization parameters for base station 130. For example, optimization manager 540 may adjust one or more of a coverage optimization parameter, an antenna tilt parameter, a power distribution parameter, a retransmission parameter, a handover parameter, a neighbor list changes parameter, a load balancing parameter, a delay optimization parameter, a carrier optimization parameter, a random access channel parameter, and/or another type of optimization parameter that may be adjusted for base station 130. In some implementations, optimization manager 540 may receive instructions from SON system 150 via OSS 160. For example, OSS interface 510 may use an API to instruct optimization manager 540 to adjust one or more SON parameters. An API call via OSS interface 510 to optimization manager 540 may include, for each SON parameter to be adjusted, a SON parameter ID and a corresponding SON parameter adjustment value.

Additionally or alternatively, optimization manager 540 may determine to adjust one or more SON parameters locally based on information obtained from KPI collector 530 and/or based on information stored in optimization DB 550. Optimization DB 550 may store information relating to optimization actions associated with particular network slices, similar to the information stored in optimization DB 345 and described below with reference to FIG. 4D. Optimization manager 540 may adjust the SON parameters for base station 130, including instructing one or more of handover manager 560, antenna manager 570, and/or load balancer 580 to perform operational parameters associated with the SON optimization determinations.

Handover manager 560 may manage handovers of UE devices 110 from base station 130 to another base station 130 and/or handovers received from other base stations 130. Handover manager 560 may maintain a set of handover parameters (e.g., event A3 parameters, such as a3offset, Hysteresisa3, timetoTriggera3, CellIndividualoffsetEutran, etc.) that are used to determine whether a particular UE device 110 should be handed over to another base station 130. Furthermore, handover manager 560 may maintain a list of neighbors identifying neighboring base stations 130.

Antenna manager 570 may manage one or more antennas associated with one or more cells of base station 130. Antenna manager 570 may perform adjustments to an antenna radiation pattern for a particular frequency band, such as, for example, mechanical tilt, remote electric tilt, auxiliary tilt, etc. Load balancer 580 may perform load balancing of traffic for base station 130. Load balancing may be performed between particular bands of base station 130, between particular cells of base station 130, and/or may include coordination of load balancing of traffic with other base stations 130.

Although FIG. 5 shows exemplary components of base station 130, in other implementations, base station 130 may include fewer components, different components, additional components, or differently arranged components than depicted in FIG. 5. Additionally or alternatively, one or more components of base station 130 may perform one or more tasks described as being performed by one or more other components of base station 130.

Figure 6:
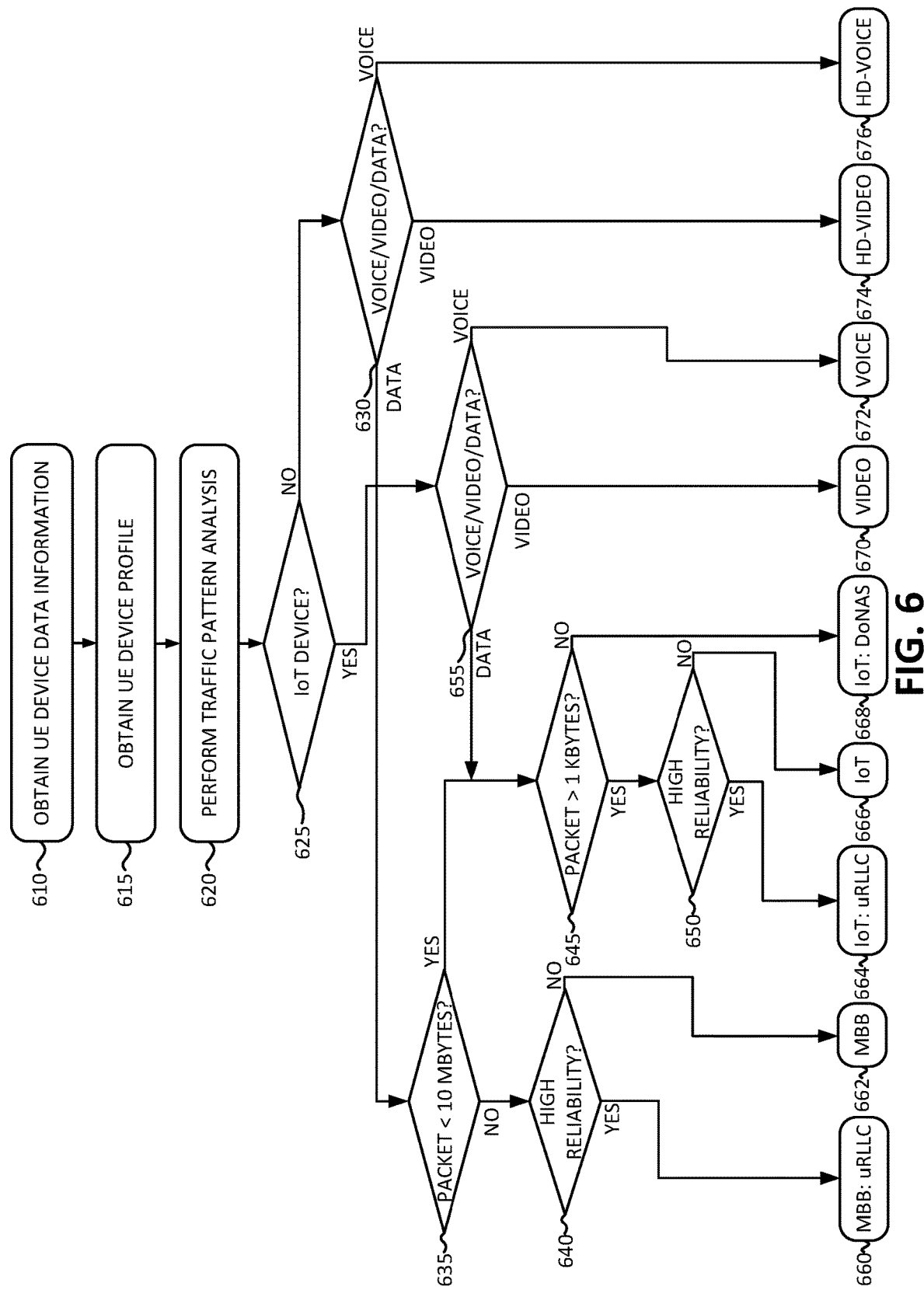
FIG. 6 is a flowchart of a process classifying UE devices into service categories according to an implementation described herein.

FIG. 6 is a flowchart of a process classifying UE devices into service categories according to an implementation described herein. In some implementations, the process of FIG. 6 may be performed by SON system 150. In other implementations, some or all of the process of FIG. 6 may be performed by another device or a group of devices separate from SON system 150, such as base station 130 and/or OSS 160.

The process of FIG. 6 may include obtaining UE device data information (block 610), obtaining a UE device profile (block 615), and performing traffic pattern analysis (block 620). For example, network slice classifier 320 may select a UE device 110 and may retrieve information relating to the selected UE device 110 that was obtained from access network 120 via OSS 160 and stored in UE device profile DB 325. A determination may be made as to whether the selected UE device 110 includes an IoT device (block 625). For example, network slice classifier 320 may determine an LTE category assigned to the selected UE device 110 and stored in UE device record 410 (e.g., in UE device ID field 412 or in data type field 416). For an example, an LTE Category 1 may be associated with IoT devices.

If it is determined that the selected UE device 110 does not include an IoT device (block 625—NO), a determination may be made as to whether the selected UE device 110 is associated with voice, video, or data (block 630). For example, network slice classifier 320 may determine whether UE device 110 is associated with a voice bearer or a video bearer. If it is determined that that the selected UE device 110 is associated with a video bearer (block 630—VIDEO), the selected UE device 110 may be classified in a high density (HD) video service category (block 674). If it is determined that the selected UE device 110 is associated with a voice bearer (block 630—VOICE), the selected UE device 110 may be classified in an HD voice service category (block 676). If it is determined that the selected UE device 110 is not associated with a voice bearer or a video bearer (block 630—DATA), processing may proceed to determine whether the selected UE device 110 is associated only with packets that are less than about 10 Megabytes (Mbytes) in size (block 635). In other implementations, a packet size different than 10 Mbytes may be used.

If it is determined that the selected UE device is not associated only with packets that are less than about 10 Megabytes in size (block 635—NO), a determination may be made as to whether the selected UE device is associated with high reliability (block 640). For example, network slice classifier 320 may determine whether the selected UE device 110 is associated with a high reliability and low latency bearer. If it is determined that the selected UE device is associated with high reliability (block 640—YES), the selected UE device 110 may be classified in a mobile broadband (MBB) uRLLC service category (block 660). If it is determined that the selected UE device is not associated with high reliability (block 640—NO), the selected UE device 110 may be classified in an MBB service category (block 662).

Returning to block 635, if it is determined that the selected UE device is associated only with packets that are less than about 10 Megabytes in size (block 635—YES), a determination may be made as to whether the selected UE device is associated with packets that are greater than about 1 Kilobyte (Kbyte) in size (block 645). In other implementations, a size different that 1 Kbyte may be used. If it is determined that the selected UE device is not associated with packets that are greater than about 1 Kbyte in size (block 645—NO), the selected UE device 110 may be classified in an IoT DoNAS service category (block 668). If it is determined that the selected UE device is associated with packets that are greater than about 1 Kbyte in size (block 645—YES), a determination may be made as to whether the selected UE device is associated with high reliability (block 650). For example, network slice classifier 320 may determine whether the selected UE device 110 is associated with a high reliability and low latency bearer. If it is determined that the selected UE device is associated with high reliability (block 650—YES), the selected UE device 110 may be classified in an IoT uRLLC service category (block 664). If it is determined that the selected UE device is not associated with high reliability (block 650—NO), the selected UE device 110 may be classified in an IoT service category (block 666).

Returning to block 625, if it is determined that the selected UE device 110 does include an IoT device (block 625—YES), a determination may be made as to whether the selected UE device 110 is associated with voice, video, or data (block 655). For example, network slice classifier 320 may determine whether the selected UE device 110 is associated with a voice bearer or a video bearer. If it is determined that that the selected UE device 110 is associated with a video bearer (block 655—VIDEO), the selected UE device 110 may be classified in a video service category (block 670). If it is determined that the selected UE device 110 is associated with a voice bearer (block 655—VOICE), the selected UE device 110 may be classified in a voice service category (block 672). If it is determined that the selected UE device 110 is not associated with a voice bearer or a video bearer (block 655—DATA), processing may proceed to block 645 as described above. While thresholds of 10 Mbytes and 1 Kbytes are described with respect to the process of FIG. 6, in other implementations, different thresholds may be used.

Figure 7:
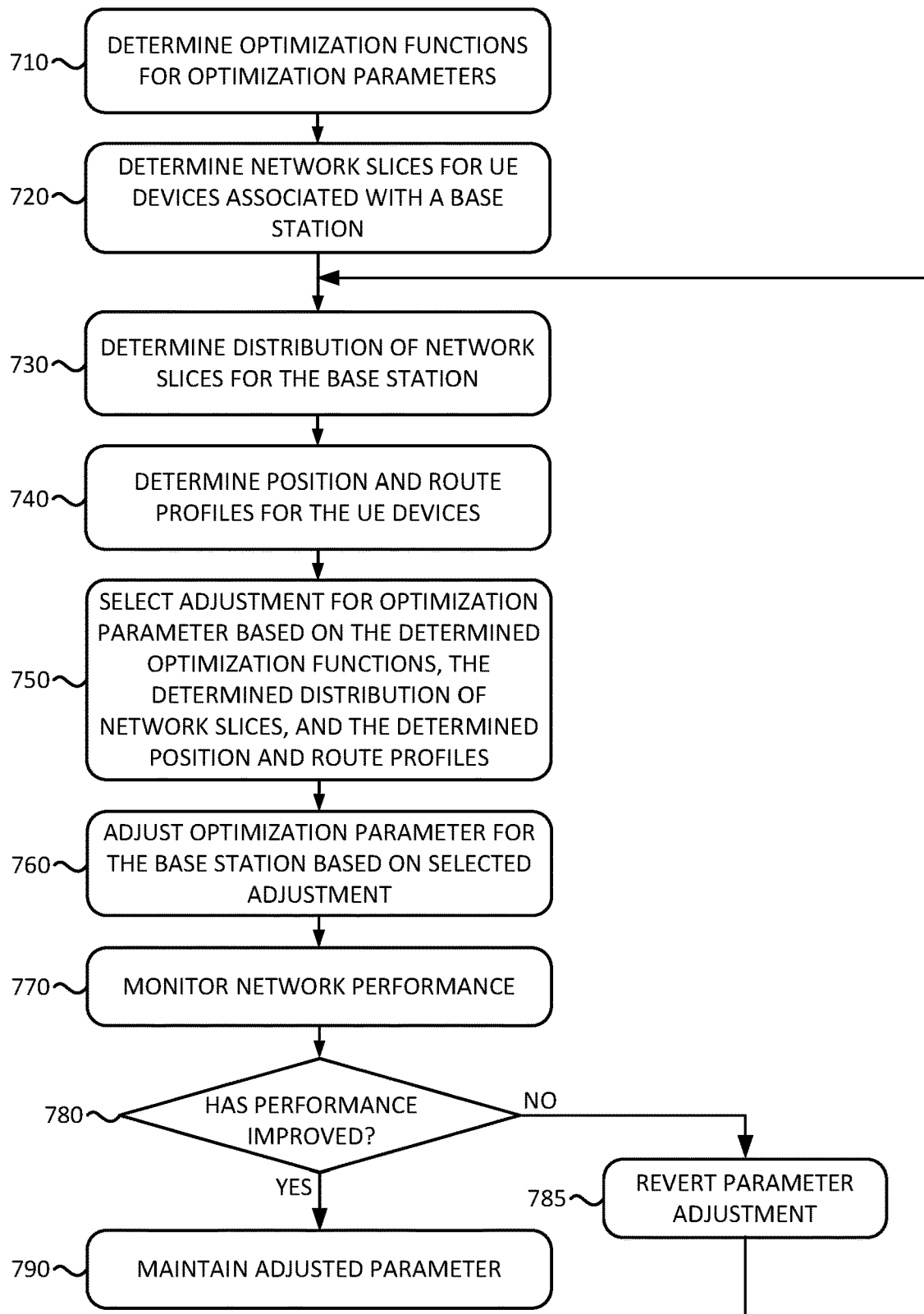
FIG. 7 is a flowchart of a process for adjusting an optimization parameter according to an implementation described herein.

FIG. 7 is a flowchart of a process for adjusting an optimization parameter according to an implementation described herein. In some implementations, the process of FIG. 7 may be performed by SON system 150. In other implementations, some or all of the process of FIG. 7 may be performed by another device or a group of devices separate from SON system 150, such as base station 130 and/or OSS 160.

The process of FIG. 7 may include determining optimization functions for optimization parameters (block 710). For example, optimization manager 340 may select an optimization function for a parameter and store the optimization function in optimization function field 464 associated with optimization record 460 for the parameter. Network slices for UE devices associated with a base station may be determined (block 720) and a distribution of network slices may be determined for the base station (block 730). For example, network slice classifier 320 may classify UE devices 110 associated with base station 130 into network slices based on information stored in UE profile DB 325, such as network slices based on service categories and/or network slices based on UE device attribute categories.

Positioning and route profiles for the UE devices may be determined (block 740). For example, position/route classifier 330 may classify UE devices 110 associated with base station 130 into position/route categories based on information stored in position/route profile DB 335.

An adjustment for an optimization parameter may be selected based on the determined optimization functions, the determined distribution of network slices, and the determined position and route profiles (block 750). The parameter adjustment for j-th network slice Sj may be represented as:

Threshold_Parameter$_{sj}$=Σ(SONoptimization function)$_{sj}$.

For example, if the parameter corresponds to a handover parameter, the optimization function for the handover parameter may be based on a minimized cost function of handover failure and dropped calls for a particular network slice Sj, which may be expressed as:

Handover_Threshold$_{sj}$=Min{Handover_Failure$_{sj}$+Dropped_Calls$_{sj}$}

In some implementations, a parameter adjustment may be computed for each network slice first, and then the distribution of network slices is used to determine a weighted sum for the total parameter adjustment. The weights may be based on the distribution of the network slices, such as a ratio based on the number of UE device 110 associated with a particular network slice to the total number of UE devices 110 associated with base station 130. In some implementations, the weights may be additionally, or alternatively, based on criticality scores assigned to particular network slices.

As an example, for an antenna tilting parameter, the optimization function may be based on a minimized cost function of the dropped calls frequency and latency, expressed as:

Antenna_Tilting$_{sj}$=Min{Dropped_Calls$_{sj}$+Latency$_{sj}$} and the total antenna tilting parameter may be based on the weighted sum of the antenna tilting parameters for particular network slices, expressed as:

Antenna_Tilting$_{TOTAL}$=Σ$_{j=1}^{N}${Antenna_Tilting$_{sj}$*W$_{sj}$}, where N is the total number of network slices and W represents the assigned weights.

In other implementations, the distribution of network slices may first be used to determine a total KPI value for each KPI used in a parameter optimization function, and the total parameter adjustment may be determined based on the total KPI values. For example, a total dropped calls KPI may be based on a weighted sum of the dropped call KPI values obtained for each network slice, expressed as:

Dropped_Calls$_{TOTAL}$=Σ$_{j=1}^{M}${Dropped_Calls$_{sj}$*W$_{sj}$}, and a total latency KPI may be based on a weighted sum of the latency KPI values obtained for each network slice, expressed as:

Latency$_{TOTAL}$=Σ$_{j=1}^{N}${Latency$_{sj}$*W$_{sj}$}.

The antenna tilting parameter may then be determined using the optimization function based on a minimized cost function of the total dropped calls and total latency, expressed as:

Antenna_Tilting$_{TOTAL}$=Min{Dropped_Calls$_{TOTAL}$+Latency$_{TOTAL}$}

Additionally, in some implementations, the weights may be adjusted based on an importance assigned to a particular network slice. For example, optimization manager 340 may receive an indication of importance associated with the particular network slice from OSS 160 and may increase the weight associated with the particular network slice, in response to receiving the indication of importance associated with the particular network slice.

The optimization parameter for the base station may be adjusted based on the selected adjustment (block 760). For example, SON system 150 may instruct base station 130, via OSS 160, to perform the selected adjustment for the optimization parameter.

Network performance may be monitored (block 770) and a determination may be made as to whether performance has improved (block 780). For example, performance monitor 360 of SON system 150 may receive one or more KPI values relating to access network 120 and/or provider network 140 and may access performance DB 365 to determine whether network performance has improved in response to the adjusted performance parameter. If it is determined that network performance has improved (block 780—YES), the adjusted parameter may be maintained (block 790). If it is determined that the network performance has not improved (block 780—NO), the parameter adjustment may be reverted (block 785). For example, performance monitor 360 may indicate to optimization manager 340 that network performance has not improved and optimization manager 340 may instruct base station 130 via OSS 160 to reverse the adjustment of the optimization parameter to a previous value.

Figure 8:
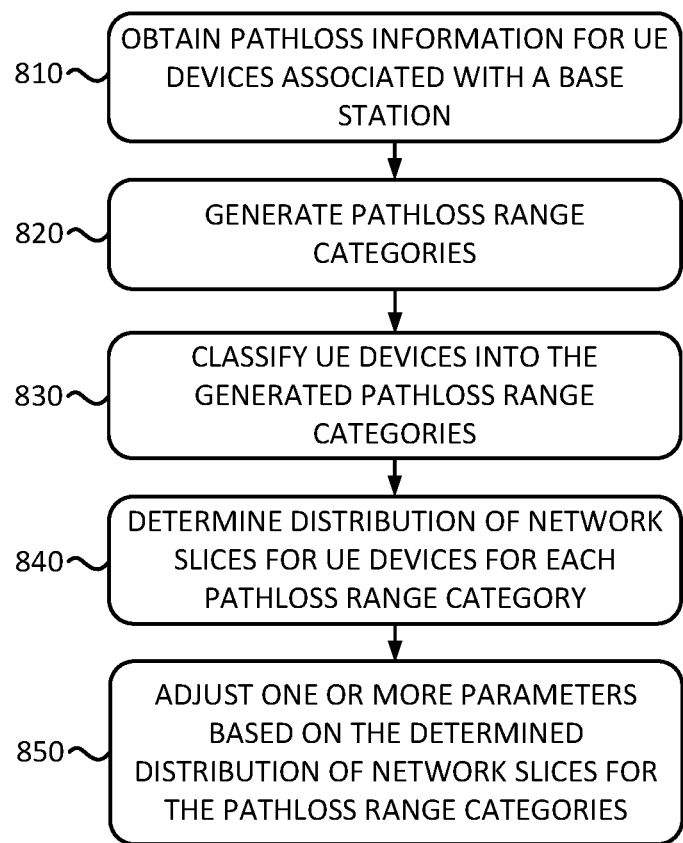
FIG. 8 is a flowchart of a process for using pathloss information according to an implementation described herein.

FIG. 8 is a flowchart of a process for using pathloss information according to an implementation described herein. In some implementations, the process of FIG. 8 may be performed by SON system 150. In other implementations, some or all of the process of FIG. 8 may be performed by another device or a group of devices separate from SON system 150, such as base station 130 and/or OSS 160.

The process of FIG. 8 may include obtaining pathloss information for UE device associated with a base station (block 810). For example, SON system 150 may obtain pathloss information for UE devices 110 associated with base station 130 from base station 130, and/or another device in access network 120, via OSS 160. Pathloss range categories may be generated (block 820), the UE devices may be classified into the generated pathloss range categories (block 830), and a distribution of network slices for the UE devices may be determined for each pathloss range category (block 840). For example, network slice classifier 320 may generate pathloss distribution table 458 based on the obtained pathloss information.

One or more parameters may be adjusted based on the determined distribution of network slices for the pathloss range categories (block 850). For example, optimization parameter 340 may determine the power level, and/or particular LTE bands/channels, for base station 130 based on the determined distribution of network slices for the pathloss range categories.

Figure 9:
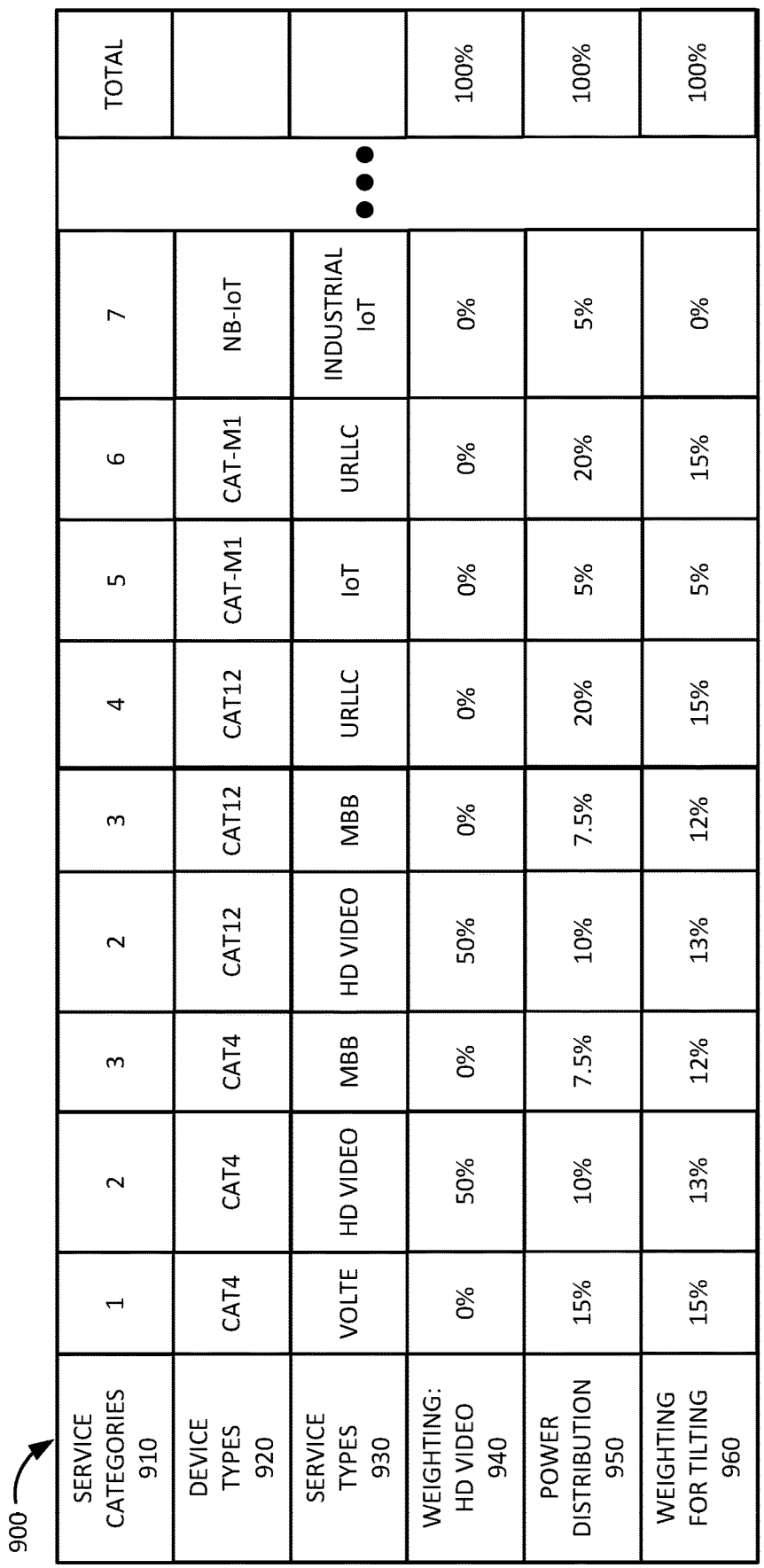
FIG. 9 is a diagram of a first exemplary network slices distribution according to an implementation described herein.

FIG. 9 is a diagram of a first exemplary network slices distribution table 900 according to an implementation described herein. Network slices distribution table 900 illustrates an implementation in which a parameter adjustment is computed for each service category first, and then the distribution of network slices is used to determine a weighted sum for the total parameter adjustment.

As shown in FIG. 9, network slices distribution table 900 includes a service categories row 910, a device types row 920, a service types row 930, a weighting for HD video row 940, a power distribution row 950, and a weighting for antenna tilting row 960.

Service categories row 910 may identify different service categories based on a classification used by SON system 150. Device types row 920 may identify an LTE device type category associated with a corresponding service category. Service types row 930 may include a description of the service category type associated with a corresponding service category. Weighting for HD video row 940 may identify the distribution of the service categories with respect to HD video. Power distribution row 950 may identify the distribution of service categories used to determine an adjustment to a power parameter. Weighting for antenna tilting row 960 may identify the distribution of service categories used to determine an adjustment to an antenna tilting parameter.

FIG. 10 is a diagram of a second exemplary network slices distribution 1000 according to an implementation described herein. Network slices distribution table 1000 illustrates an implementation in which the distribution of network slices is used first to determine a total KPI value for each KPI used in a parameter optimization function, and in which the total parameter adjustment is determined based on the total KPI values. As shown in FIG. 10, network slices distribution table 1000 includes a service categories row 1010, a device types row 1020, a service types row 1030, a weighting for a drop call KPI 1040, and a weighting for a latency KPI 1050.

Service categories row 1010 may identify different service categories based on a classification used by SON system 150. Device types row 1020 may identify an LTE device type category associated with a corresponding service category. Service types row 1030 may include a description of the service category type associated with a corresponding service category. Weighting for a drop call KPI 1040 may identify the distribution of service categories used to determine a total value for the drop call KPI. Weighting for a latency KPI 1050 may identify the distribution of service categories used to determine a total value for the latency KPI.

FIG. 11 is a diagram of a third exemplary network slices distribution 1100 according to an implementation described herein. As shown in FIG. 11, network slices distribution 1100 may include a device type row 1110, a less than 80 decibel (dB) pathloss range value category row 1120, a 80-100 dB pathloss range value category row 1130, a 100-120 dB pathloss range value category row 1140, and an over 120 dB pathloss range value category row 1150.

Device types row 1110 may identify an LTE device type category associated with a corresponding service category. Each of rows 1120, 1130, 1140, and 1150 may include a distribution of network slices for the particular pathloss range values category associated with the row. The distribution of network slices for each pathloss range values category may be used to adjust a power parameter for base station 130, and/or to select particular bands and/or channels, for each particular pathloss range values category.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining, by a device, weights for different ones of a plurality of network slices associated with a base station, based on a ratio of a number of user equipment (UE) devices associated with a particular network slice to a total number of UE devices serviced by the base station;
    computing, by the device, network slice adjustments for an optimization parameter for different ones of the plurality of network slices;
    computing, by the device, an adjustment for the optimization parameter based on the computed network slice adjustments and the determined weights; and
    adjusting, by the device, the optimization parameter for the base station based on the computed adjustment, wherein the adjusted optimization parameter is used by the base station to manage data traffic for the UE devices serviced by the base station.

2. The method of claim 1, further comprising:
    receiving an indication of importance for the particular network slice of the plurality of network slices; and
    adjusting a weight associated with the particular network slice, in response to receiving the indication of importance for the particular network slice.

3. The method of claim 1, further comprising:
    determining a performance score for a wireless access network associated with the base station based on the adjusted optimization parameter; and
    reverting the optimization parameter to a previous value, when the determined performance score does not result in an improvement over a previous performance score.

4. The method of claim 1, further comprising:
    determining positioning and route profiles for the UE devices serviced by the base station, wherein the positioning and route profiles indicate historical position and routes associated with particular ones of the UE devices serviced by the base station; and
    wherein adjusting the optimization parameter for the base station is further based on the determined positioning and route profiles for the UE devices serviced by the base station.

5. The method of claim 1, wherein the optimization parameter includes at least one of:
    a coverage optimization parameter;
    an antenna tilt parameter;
    a power distribution parameter;
    a retransmission parameter;
    a handover parameter;
    a neighbor list changes parameter;
    a load balancing parameter;
    a delay optimization parameter;
    a carrier optimization parameter; or
    a random access channel parameter.

6. The method of claim 1, wherein adjusting the optimization parameter for the base station is further based on one or more performance indicators, wherein the one or more performance indicators include at least one of:
    an accessibility performance indicator,
    a retainability performance indicator,
    a mobility performance indicator,
    a service integrity performance indicator,
    a utilization performance indicator,
    an availability performance indicator,
    a traffic performance indicator, or
    a response time performance indicator.

7. The method of claim 1, further comprising:
  determining the plurality of network slices associated with the base station using a machine learning classifier trained to determine network slices for UE devices.

8. The method of claim 7, wherein the machine learning classifier is trained to classify UE devices in at least one of:
  a high density voice service category,
  a high density video service category,
  a mobile broadband (MBB) service category,
  an MBB Ultra-Reliable Low Latency (URLLC) service category,
  a voice service category,
  a video service category,
  an Internet of Things (IoT) data category,
  an IoT URLLC category, or
  a Data over Non-Access Stratum (DoNAS) service category.

9. The method of claim 7, wherein determining the plurality of network slices associated with the base station using the machine learning classifier trained to determine network slices for UE devices includes:
  obtaining a UE device profile for a UE device; and
  performing a traffic pattern analysis for traffic associated with the UE device.

10. The method of claim 7, wherein the machine learning classifier is trained to classify particular ones of the UE devices serviced by the base station into an Internet of Things data service category based on packet size.

11. The method of claim 7, wherein the machine learning classifier is trained to classify particular ones of the UE devices serviced by the base station into a Data over Non-Access Stratum (DoNAS) service category based on packet size.

12. The method of claim 7, wherein the machine learning classifier is trained to classify particular ones of the UE devices serviced by the base station into a voice, video, or data service category based on bearer type.

13. A device comprising:
  a processor configured to:
    determine weights for different ones of a plurality of network slices associated with a base station, based on a ratio of a number of user equipment (UE) devices associated with a particular network slice to a total number of UE devices serviced by the base station;
    compute network slice adjustments for an optimization parameter for different ones of the plurality of network slices;
    compute an adjustment for the optimization parameter based on the computed network slice adjustments and the determined weights; and
    adjust the optimization parameter for the base station based on the computed adjustment, wherein the adjusted optimization parameter is used by the base station to manage data traffic for the UE devices serviced by the base station.

14. The device of claim 13, wherein the processor is further configured to:
  receive an indication of importance for the particular network slice of the plurality of network slices; and
  adjust a weight associated with the particular network slice, in response to receiving the indication of importance for the particular network slice.

15. The device of claim 13, wherein the processor is further configured to:
  determine a performance score for a wireless access network associated with the base station based on the adjusted optimization parameter; and
  revert the optimization parameter to a previous value, when the determined performance score does not result in an improvement over a previous performance score.

16. The device of claim 13, wherein the processor is further configured to:
  determine positioning and route profiles for the UE devices serviced by the base station, wherein the positioning and route profiles indicate historical position and routes associated with particular ones of the UE devices serviced by the base station; and
  wherein, when adjusting the optimization parameter for the base station, the processor is further configured to:
    adjust the optimization parameter for the base station based on the determined positioning and route profiles for the UE devices serviced by the base station.

17. The device of claim 13, wherein the processor is further configured to:
  determine the plurality of network slices associated with the base station using a machine learning classifier trained to determine network slices for UE devices.

18. The device of claim 17, wherein the machine learning classifier is trained to classify UE devices in at least one of:
  a high density voice service category,
  a high density video service category,
  a mobile broadband (MBB) service category,
  an MBB Ultra-Reliable Low Latency (URLLC) service category,
  a voice service category,
  a video service category,
  an Internet of Things (IoT) data category,
  an IoT URLLC category, or
  a Data over Non-Access Stratum (DoNAS) service category.

19. The device of claim 17, wherein the machine learning classifier is trained to at least one of:
  classify particular ones of the UE devices serviced by the base station into an Internet of Things data service category based on packet size,
  classify particular ones of the UE devices serviced by the base station into a Data over Non-Access Stratum (DoNAS) service category based on packet size, or
  classify particular ones of the UE devices serviced by the base station into a voice, video, or data service category based on bearer type.

20. A system comprising:
  a base station configured to provide a wireless connection to a plurality of user equipment (UE) devices; and
  a network optimizing device configured to:
    determine weights for different ones of a plurality of network slices associated with the base station, based on a ratio of a number of user equipment (UE) devices associated with a particular network slice to a total number of UE devices serviced by the base station;
    compute network slice adjustments for an optimization parameter for different ones of the plurality of network slices;
    compute an adjustment for the optimization parameter based on the computed network slice adjustments and the determined weights; and
    adjust the optimization parameter for the base station based on the computed adjustment, wherein the adjusted optimization parameter is used by the base station to manage data traffic for the UE devices serviced by the base station.

\* \* \* \* \*